(12) United States Patent
Fellows (10) Patent No.: US 6,910,332 B2
(45) Date of Patent: Jun. 28, 2005

(54) THERMOACOUSTIC ENGINE-GENERATOR (76) Inventor: Oscar Lee Fellows, 112 Clear Spring Rd., Georgetown, TX (US) 78628-2611

( * ) Notice: Subject to any disclaimer, the term of this patent is extended or adjusted under 35 U.S.C. 154(b) by 204 days.

(21) Appl. No.: 10/656,144

(22) Filed: Sep. 8, 2003

(65) Prior Publication Data
US 2005/0016171 A1 Jan. 27, 2005

Related U.S. Application Data (60) Provisional application No. 60/418,258, filed on Oct. 15, 2002.
(51) Int. Cl.$^7$ .............................. F01B 29/10; F02B 9/00; F25B 9/00; H01L 41/08; H02N 2/00
(52) U.S. Cl. ........................... 60/520; 62/6; 310/323.03
(58) Field of Search .............. 60/520; 62/6; 310/323.03

(56) References Cited

U.S. PATENT DOCUMENTS

| | | | |
|---|---|---|---|
| 6,385,972 B1 * | 5/2002 | Fellows ........................ | 60/517 |
| 6,514,047 B2 * | 2/2003 | Burr et al. ..................... | 417/53 |
| 6,578,364 B2 * | 6/2003 | Corey ............................. | 62/6 |
| 6,725,670 B2 * | 4/2004 | Smith et al. ................... | 60/520 |

* cited by examiner

Primary Examiner—Sheldon J Richter (57) ABSTRACT

A thermoacoustic engine-generator that converts waste heat into electrical power. Thermal energy is converted to useful work via temperature-pressure amplification of periodic acoustic traveling waves in a compressible working fluid which cause the armature of a linear alternator to reciprocate and produce alternating current electrical energy. An external oscillator initiates reciprocating motion in the armature of a linear alternator. The armature is a combination fluid pump and fluid motor as well as the induction armature of a linear alternator. The pump end of the armature generates an acoustic traveling wave with each cycle of the armature. The traveling wave enters a waveguide-heat exchanger and is amplified in temperature, pressure and propagation velocity by thermal conduction of energy through the wall of the waveguide. The amplified traveling wave acts upon the opposite end of the armature, causing it to reciprocate within the magnetic field windings of the generator, and generate an electrical current as well as a new acoustic traveling wave. When the operating temperature gradient is attained across the hot and cold heat exchangers, the thermoacoustic engine-generator becomes acoustically resonant and self-regenerative, and will continue to operate as long as the thermal gradient is maintained. The theoretical conversion efficiency is dependent on the thermal gradient, and is 63% of Carnot.

19 Claims, 3 Drawing Sheets

THERMOACOUSTIC ENGINE-GENERATOR

This application claims benefit of U.S. Provisional 60/418,258 filed Oct. 15, 2002.

BACKGROUND OF THE INVENTION

The subject invention originates from twenty-two years research by the inventor, into engines and resonators that operate on the principles of thermoacoustic physics. For purposes of this application for patent, the term "thermoacoustic" refers to traveling energy impulses, normally detected as pressure fluctuations, propagating along velocity vectors that move thermal energy through an elastic medium that is typically a compressible working fluid. For purposes of this application for patent, thermoacoustic energy includes both shockwaves (supersonic and hypersonic pressure waves) and sound waves (pressure waves traveling at the sonic velocity of the working fluid under locally extant conditions).

The research background data in heat, acoustic wave phenomena and gas mechanics includes the shock tube research performed by government and institutional scientists during the 1950's and 1960's, relevant examples of which can be found in the *Proceedings of the Seventh International Shock Tube Symposium*, University of Toronto Press 1970, ISBN 0-8020-1729-0; as well as research into thermoacoustic waves generated by chemical explosives, *The Chemistry of Powder and Explosives*, Volume I, 1941, Volume II, 1943, by Tenney L. Davis, Ph.D., ISBN 0913022-00-4; published research in atmospheric physics, including *Lightning*, by Martin A. Uman, McGraw-Hill 1969; *The Flight of Thunderbolts*, $2^{nd}$ ed., B. F. J. Schonland, Clarendon Press 1964; *Graphic Survey of Physics*, by Alexander Taffel, Oxford Book Company 1960; *Matter and Motion*, by James Clerk Maxwell, 1877, Dover Publications 1991 (reprint); *Laboratory Exercises in Physics*, Fuller and Brownlee, Allyn and Bacon 1913; *Laboratory Experiments in Elementary Physics*, by Newton Henry Black, Macmillan Company, 1944; *Modern Physics*, by Williams, Metcalfe, Trinklein and Lefler, 1968, Holt, Rinehart and Winston Publishers; *Physics of Lightning*, D. J. Malan, The English Universities Press Ltd., 1963; which includes thermoacoustic phenomena generated by natural lightning and man-made electric arcs.

Other relevant published research includes work in pulse tube refrigeration, including *The Influence of Heat Conduction on Acoustic Streaming*, Nikolaus Rott, Journal of Applied Mathematics and Physics (ZAMP), vol. 25, pp. 417–421, 1974; *A Review of Pulse Tube Refrigeration*, Ray Radebaugh, Cryogenic Engineering Conference, pp. 1–14, 1989; *Flow Patterns Intrinsic to the Pulse Tube Refrigerator*, J. M. Lee, P. Kittel, K. D. Timmerhaus, R. Radebaugh, National Institute of Standards and Technology, pp. 125–139, 1993.

The cryogenics department at NASA-Ames is a premier focus of pulse tube refrigeration research. Pulse tubes differ from most thermoacoustic devices in that they are typically non-resonant devices in which a mechanical piston, driven by an external power source, generates compression waves (pulses) that move in one direction through a series of heat exchangers, and cause thermal energy to be transported between those heat exchangers. Pulse tubes are typically used in cryogenic refrigeration applications. Pulse tubes are similar to most thermoacoustic devices in that traveling pressure waves in an elastic working fluid are the mode of operation.

The research history involving prime movers with associated thermoacoustic characteristics includes *Stirling Cycle Machines*, by Graham Walker, PhD, 1973, Oxford University Press; various Stirling engine technical research reports, 1937–1978, issued by The Philips Company Laboratories, Eindhoven, Netherlands; and *Stirling Cycle Engines*, by Andy Ross, 1977, published by Solar Engines, Phoenix, Ariz.

The device described herein is a traveling-wave Thermoacoustic Cycle (TAC) engine-generator set, comprised of a gas tight housing containing a compressible working fluid under pressure in which acoustic traveling waves are caused to propagate; a multiplicity of heat exchangers in which said acoustic traveling waves are amplified by a thermal gradient that causes said acoustic traveling waves to increase in pressure and temperature amplitudes and in wave propagation velocity; and an electrodynamic armature that said acoustic traveling waves impinge upon and cause to reciprocate within a magnetic field generating means in order to generate electrical energy.

TAC engines are well known to acoustic science, are in USPTO Class 310 and International Class H01L 041/08, and have been explored extensively by Peter H. Ceperley, George Mason University; Steven Garrett of Penn State University and Gregory Swift of Los Alamos National Laboratory. Thermoacoustic related patents searched include:

| | | | |
|---|---|---|---|
| 6,385,972 | May 2002 | Fellows | 60/517 |
| 6,054,775 | April 2000 | Vocaturo | 290/1R |
| 6,032,464 | March 2000 | Swift, et al | 60/517 |
| 5,953,920 | September 1999 | Swift, et al | 60/520 X |
| 5,892,293 | April 1999 | Lucas | 90/1R |
| 5,673,561 | October 1997 | Moss | 62/6 |
| 5,659,173 | August 1997 | Putterman, et al | 250/361 |
| 5,647,216 | July 1997 | Garrett | 62/6 |
| 5,519,999 | May 1996 | Harpole, et al | 60/520 X |
| 5,515,684 | May 1996 | Lucas, et al | 62/6 |
| 5,456,082 | October 1995 | Keolian, et al | 62/6 |
| 5,319,938 | June 1994 | Lucas | 62/6 |
| 5,303,555 | April 1994 | Chrysler, et al | 62/6 |
| 5,295,355 | March 1994 | Zhou, et al | 62/6 |
| 5,275,002 | January 1994 | Inoue, et al | 62/6 |
| 5,269,147 | December 1993 | Ishizaki, et al | 62/467 |
| 5,263,341 | November 1993 | Lucas | 62/6 |
| 5,165,243 | November 1992 | Bennett | 62/6 |
| 4,722,201 | February 1988 | Hoffler, et al | 62/467 |
| 4,686,407 | August 1987 | Ceperley | 60/721 |
| 4,599,551 | July 1986 | Wheatley, et al | 322/2R |
| 4,398,398 | August 1983 | Wheatley, et al | 62/467 |
| 4,355,517 | October 1982 | Ceperley | 60/721 |
| 4,114,380 | September 1978 | Ceperley | 60/721 |

Standing wave Thermoacoustic Cycle (TAC) engines are typically comprised of a gas tight resonant cavity in the approximate shape of a cylinder, tube or torus, and internal isothermal heat exchangers that are separated by a regenerative heat exchanger (stack) and spaced along the length of the resonant cavity by a nominal wavelength or fraction thereof. An applied difference in thermal potential, across the length of the cavity, is created by a thermal gradient between the two isothermal heat exchangers. In standing wave resonators, the thermal gradient alone is sufficient to produce and amplify acoustic waves which transport thermal energy from one heat exchanger to another, and to maintain a state of oscillation, or periodic thermal and acoustic flux, in the working fluid.

To extract useful work from the engine, the oscillating pressure component can be applied to a mechanical member, such as a piston, in order to perform reciprocating work, and thereby used to perform tasks such as pumping fluids or generating electrical energy.

TAC engines have been researched for several decades, and researchers at the Los Alamos National Laboratory, the Naval Post Graduate School, The University of Texas, Penn State University and other institutions have written numerous research papers on the genre, primarily concerning standing-wave thermoacoustic physics. A standing-wave thermoacoustic refrigerator developed by Steven Lurie Garrett was flown aboard the space shuttle Discovery in 1991 as an experimental package. It is mentioned (project 511) along with this inventor's Acoustic Cycle engine (project 503) in the 1993 *Rolex Awards For Enterprise*, published December, 1992. Currently, there are approximately thirty relevant patents in the field.

The most significant problem with prior art thermoacoustic engines and refrigerators is that they have a very low power density. They are typically much larger and more massive for the amount of output work they produce, than other types of engines and refrigerators. Until 1998, disregarding non-resonant pulse tubes, most researchers working in the field, including Gregory Swift's Los Alamos group, concentrated their efforts largely on thermoacoustic engines that employed standing wave physics. The power output of standing wave systems is limited by the inherent physical characteristics, to wit; standing wave systems rely on the forward-going wave being inverted and reflected uniformly back along the resonator at nearly the same propagation velocity. If too much energy is extracted from the forward-going wave in the cold-side heat exchanger, the propagation velocity of the return wave is changed and the forward-going wave and the return wave will be out of phase and will interfere with each other. This adds impedance to the cycle and tends to damp the oscillation. This inherent characteristic severely limits the quantity of energy per cycle that is available to perform useful work, resulting in large engines with low power density.

Traveling-wave engines and pulse tubes, by comparison, do not rely on reflected waves to maintain system oscillation. Traveling-wave engines ideally eliminate the reflected wave, and propagate thermoacoustic energy in only one direction, thereby reducing the impeding effects of a change in wave propagation velocity on the system, and increasing the amount of useful energy that can be extracted from the system. All traveling-wave thermoacoustic engines, to some degree, experience a phenomenon known to practitioners of the art as "streaming". The term refers to the physical motion of the working fluid. Where the desirable state of operation in most thermoacoustic engines is such that the mass of the working fluid resides in a static state, with the energy transport confined to pressure impulses (acoustic waves) that transit the working fluid, streaming is considered as an impedance; an undesirable effect. Streaming can be caused by convection currents and by physical displacement of the working fluid mass by the pressure impulses. This is typically problematic only in traveling-wave engines, where the energy impulses travel in only one direction.

In 1998–99, Greg Swift of Los Alamos attempted to improve on prior art by coupling Ceperley's torus-shaped traveling-wave engine with a cylindrical standing-wave resonator, in an effort to produce greater output power from the traveling-wave component, without damping the standing-wave oscillator. He also added mechanical elements to inhibit streaming. Even so, the compound engine develops low energy density because the design still relies mainly on conventional acoustics theory and geometry to produce an engine that is acoustically resonant.

BRIEF SUMMARY OF THE INVENTION

The subject invention described herein is a traveling-wave thermoacoustic engine that conquers the problem of low power density through use of a design methodology conceived and developed by the inventor, in which metered, low velocity streaming is encouraged in order to reduce the size of heat exchangers while still maintaining a desired temperature differential in the working fluid, and the wave propagation velocity and temperature-pressure gradients are increased and amplified by means of a combination heat exchanger-waveguide that has acoustic characteristics similar to an exponential horn.

Thermal energy amplifies the traveling wave in the same manner as is described in U.S. Pat. No. 6,385,972 May, 2002, Fellows, 60/517. The primary differences between the MEMS Thermoacoustic Resonator that is the subject of the aforementioned patent and the subject of this patent application are in physical geometry and physical size. The combination waveguide-heat exchanger is designed so as to present the heated area of the waveguide more effectively to heat streams comprised of flowing fluids such as exhaust gases from combustion engines, and heated liquids. Whereas the purpose of the miniature Thermoacoustic Resonator in U.S. Pat. No. 6,385,972 May, 2002, Fellows, is to harvest radiant energy, and thermal energy via conduction through contact with hot surfaces, the subject invention of this application is meant primarily to harvest waste energy from fluid heat streams.

The science of acoustics, like the electrical sciences, is concerned with the transmission of energy through a conductive medium. The type of medium determines its impedance characteristics; its resistance to the energy flow; and to the coupling efficiency, or energy transmission ratio, when one medium interfaces with another. The energy state of the medium, including temperature and pressure, also effects impedance and coupling efficiency when a medium in one energy state interacts with the same medium in a different energy state. These characteristics become particularly evident in Fellows patent U.S. Pat. No. 6,385,972, May 14, 2002, in which the thermo-reactive properties of solids and fluids are engineered to increase energy transmission and coupling efficiency in a variety of energy conducting media in order to increase the energy density; and thereby the specific power to weight ratio of thermoacoustic engines.

As in U.S. Pat. No. 6,385,972 May, 2002, Fellows, the principal improvement on prior art is a significant increase in power density. As described above, the combination acoustic horn waveguide and heat exchanger performs two basic functions. First, the waveguide-heat exchanger HX sub h changes the state of equilibrium in the working fluid that is migrating through it by creating a velocity gradient in the acoustic waves that transit the working fluid, as well as a pressure-temperature gradient. Both gradients increase in the same direction. Second, the geometry of HX sub h is engineered to present less impedance to the acoustic waves traveling in the same direction as the increase in gradients. The waveguide function of HX sub h is similar to that of an exponential or hyperbolic horn. Horns are essentially impedance-matching acoustic transformers; waveguides that are designed to efficiently couple the energy of a medium in a given energy state, with the same medium in a different energy state.

In the subject invention, the tapered, horn-like waveguide offers a progressively greater cross-sectional area to the working fluid, thereby presenting a corresponding decrease in impedance to acoustic waves traveling in one direction, and thereby promoting unidirectional acoustic wave propagation. Energy is also progressively added to the working fluid and the acoustic waves via thermal conduction through the walls of the waveguide. The conductive area of the waveguide increases in the direction of increased cross-section which means that the energy conveyed to the working fluid increases progressively in the direction of wave propagation. These factors combined tend to progressively increase the sonic velocity of the working fluid in the direction of wave propagation and to progressively amplify the acoustic energy gradient in the acoustic wave-train.

In operation, a parcel of the static working fluid is pumped from the cooler section HX sub c into the heated waveguide by an acoustic wave generating means, said acoustic wave generating means preferably being a flexible piston diaphragm arrangement, similar in function to a loudspeaker or a bellows-type air pump, affixed at its center to the free moving generator armature shaft and affixed at its periphery to the inner wall of the generator housing. The acoustic wave generating means, so configured, therefore doubles as a flexible spring suspension and mounting means for the armature shaft, and a pneumatic piston.

The parcel of working fluid is slightly compressed by the action of the acoustic wave generating means, and expelled through a check valve into the throat of the waveguide. Upon entering the waveguide, the parcel begins to take up heat and to increase in temperature, pressure and propagation velocity. It expands, thereby generating a thermoacoustic wavefront, a traveling wave pressure impulse that expands through the waveguide in the direction of least resistance. As the parcel continues to take up heat, expansion forces and waveguide geometry propel the parcel (thermoacoustic wavefront) toward the mouth of the waveguide. The thermal energy, pressure and sonic velocity gradients of the thermoacoustic wavefront continue to increase in relation to the increase in heated surface area and volume of the horn, as the wavefront transits the horn along the axis of the waveguide HX sub h from throat to mouth.

The wavefront exits the waveguide into an acoustic wave driven means. The acoustic wave driven means is a second piston diaphragm similar to the acoustic wave generating means, and also doubles as a second flexible suspension mounting means for the armature, disposed within the generator housing and affixed to the armature and generator housing in the same way as the acoustic wave generating means, to wit: affixed at its center to the opposite end of the generator armature shaft from the acoustic wave generating means, and also affixed at its periphery to the inner wall of the generator housing.

Said acoustic wave driven means transforms the periodic acoustic energy emitted by the waveguide into pulsating mechanical force that causes the armature to reciprocate in relation to the magnetic field generating means, and thereby converts acoustical energy to mechanical energy to electrical energy.

The acoustic wave generating means and acoustic wave driven means operate similarly to an acoustic loudspeaker system known to practitioners of the art as a passive radiator loudspeaker system, wherein the piston diaphragm of a passive loudspeaker is driven by acoustic waves generated by the piston diaphragm of an active loudspeaker. The passive and active loudspeaker elements are in acoustic communication, via a connecting cavity containing a compressible working fluid, said connecting cavity having geometric dimensions that favor a particular acoustic wavelength. At said particular acoustic wavelength, inside the connecting cavity, the active and passive loudspeakers are 360 degrees out of phase. Externally, they operate in synchronous phase with one another, and reinforce the acoustic energy output of the speaker system.

In the TAC Generator, the acoustic wave driven means is attached to the opposite end of the armature from the acoustic wave generating means, so that the armature, acoustic wave generating means and acoustic wave driven means are physically connected and move together as a single unit. The acoustic wave generating means and acoustic wave driven means are also in acoustic communication via a second path, a loop, formed by the working fluid and waveguide geometry.

By these physical and acoustic means, when the armature is caused to move along its axis by an acoustic wave exiting the waveguide and impinging on the acoustic wave driven means, the acoustic wave generating means also moves and generates a second acoustic wave. At the end of the armature stroke, the armature will be caused to rebound toward its original position. The geometry of the waveguide is such that, given specific physical conditions in the working fluid, the second acoustic wave will exit the acoustic wave generating means and transit the waveguide in a specific period of time and arrive at the acoustic wave driven means at the moment when the armature has reached the limit of its rebound stroke. The second acoustic wave acts on the acoustic wave driven means and moves the armature through another stroke, which causes another acoustic wave to be generated by the acoustic wave generating means. As long as the appropriate working fluid conditions and thermal gradient are maintained, the cyclic process is auto-regenerative and continuous.

At the end of the armature stroke, the over-pressure created by the thermoacoustic wave is expelled from the acoustic wave driven means into the cooling section HX sub c via a metering orifice. The pressure in the acoustic wave driven means becomes less than the pressure in the acoustic wave generating means and the resultant gas spring action causes the armature to rebound toward its original position. The rebounding armature causes the pressure in the acoustic wave generating means to drop, and working fluid is pulled into the acoustic wave generating means from the cooling section HX sub c.

In the vernacular of the art, the waveguide acts as a delay line, and is so designed as to time the arrival of each acoustic wave so that the armature oscillation becomes resonant, and tends to become self sustaining in its oscillation.

As stated above, the design geometry of the horn waveguide heat exchanger HX sub h is such that when the working fluid attains the operating temperature gradient between heat exchangers HX sub h and HX sub c, the TAC Engine-generator attains resonance and the reciprocating action of the armature tends to become self-sustaining. Each oscillation of the armature pumps another parcel of working fluid into the waveguide; each parcel of working fluid absorbs heat and expands through the waveguide and produces another oscillation in the armature.

The linear electric generator is a combination motor-generator. When heat energy is first applied to HX sub h, controls energize an oscillator circuit and coolant pump. The oscillator sends an alternating current through a winding in the generator field generating means. The oscillator circuit and winding, by inductive action well known to electrical engineering science, cause the armature to reciprocate, thereby generating traveling waves in the waveguide-heat exchanger. As the temperature of the waveguide-heat exchanger and the working fluid increases, thermoacoustic energy begins to take over the task of causing the armature to reciprocate, inducing a reverse current in the field windings and causing a bucking voltage to develop in the generator output winding. Said bucking voltage exceeds the motor current from the oscillator circuit, causing the oscillator circuit current to decline as the generator output circuit current increases. When the engine reaches operating temperature, and resonance, current from the oscillator circuit is at a minimum value, at or near zero, and generator output current to an external load is at a maximum value.

The horn waveguide HX sub h is separated from the electric generator and the cooler HX sub c by a thermal insulator, also called a thermal break, that divides the TAC Engine-Generator housing into two sections which are distinguished by the difference in the temperature and dynamic pressure gradients of the working fluid contained therein. The thermal break reduces short-circuit thermal conduction between the waveguide-heat exchanger HX sub h section, and the generator and cooler HX sub c section. Its purpose is to minimize thermal losses from the working fluid via the conductive parts of the engine housing, and to limit the path of energy exchange to the working fluid, thereby reducing energy losses in the invention. The thermal break is located between the waveguide-heat exchanger HX sub h and the generator housing. Said generator housing, in conjunction with HX sub h, contains the working fluid under pressure. Said generator housing is preferably comprised of metal, though ceramics and thermoplastics can also be used in some parts of it. HX sub h is preferably comprised of heat conducting material, typically a metal.

The frequency of the generator output current is determined by the engineered properties of all the heat exchangers, and by the geometry of the acoustic waveguide-heat exchanger HX sub h.

The propagation velocity of traveling waves is determined by the nature and operating conditions of the working fluid. In the thermoacoustic engine generator, traveling waves propagate through the working fluid from HX sub h, to HX sub c, transporting thermal energy between the two. Said traveling waves take up energy from an external heat source during transit of the horn waveguide-heat exchanger HX sub h. Said energy causes said traveling waves to increase in sonic propagation velocity, and in pressure and temperature amplitude in accordance with Charles Law. The amplified traveling waves appear to the acoustic wave driven means as a periodic fluctuation in the pressure of the working fluid. The oscillation in pressure in the working fluid causes the armature to reciprocate within a magnetic field, and generates an electric current in an electrical field winding. Said electrical field winding is connected to electrical conductors that exit the TAC Engine-Generator housing in the form of terminals that convey the electrical energy from within the TAC Engine-Generator to an external load.

The TAC Engine-Generator can be designed to operate across a wide temperature range. The operating range with common materials is from <100 Kelvins to >1200 Kelvins. Higher temperatures, and thus a wider absolute range, are possible with development of waveguide-heat exchangers comprised of advanced materials, such as ceramics and high-temperature metal alloys. The nominal operating temperature of any individual TAC engine-generator is a relatively narrow range of temperature within that broad range of material capability, at which the device is resonant, and is engineered into the device during manufacture, to suit a specific application and set of operating conditions.

Energy conversion efficiencies are directly related to the temperature gradient across the TAC Engine-Generator. For example, with a cold sink HX sub c temperature of 273K and waveguide-heat exchanger HX sub h temperature of 1210K, theoretical (Carnot) efficiency is 77% (1210K−273K/1210K=0.77), and actual realizable efficiency is 48% (0.77*0.63=0.48).

Such efficiencies are possible within the nominal limits of commercially available and economical materials, and common fabrication processes such as stamped and machined steel and aluminum components. TAC Engine-Generators may be manufactured in a variety of sizes.

A variety of working fluids are employed in the manufacture of TAC engines. Each working fluid has unique physical properties. Mixtures of the noble gases are the working fluids preferred for the TAC Engine-Generator, though other gases, including air, can also be used. Traveling wave thermoacoustic engines designed for power generation have different working fluid requirements than standing wave thermoacoustic engines used mostly for refrigeration. When refrigeration is the objective, working fluids with high thermal conductivity and specific heats are paramount for efficiency. In traveling wave machines used in mechanical conversion applications such as linear generators, working fluids with high molecular weight are preferred for higher efficiency. The reason for this is that the main energy metric in a traveling wave engine generator is the kinetic energy delivered to the piston of the linear generator. The formula describing kinetic energy is:

$$W_k = \tfrac{1}{2}mv^2$$

For example, the kinetic energy of a traveling wave propagating through air, compared to that of a traveling wave propagating through argon, under a given set of operating conditions, is shown in the table below:

TABLE 1

| Working Fluid | Mole Wt. | Heat Ratio | Temp. (F.°) | Sonic Velocity (ft/sec) | Waveguide Frequency (Hz) | Wt@ 10 atm. (lb/ft3) | Thermal Energy Btu/ft$^3$ | Kinetic Energy lb-ft/sec | Power (hp) |
|---|---|---|---|---|---|---|---|---|---|
| Air | 8.96 | 1.4 | 900 | 1807 | 60 | 0.74 | 159 | 37549 | 68 |
| Argon | 9.94 | 1.67 | 900 | 1681 | 60 | 1.02 | 114 | 44769 | 81 |
| Helium | 4.00 | 1.66 | 900 | 5297 | 60 | 0.1 | 111 | 43572 | 79 |
| Krypton | 83.8 | 1.68 | 900 | 1164 | 60 | 2.14 | 113 | 45044 | 82 |
| Neon | 20.17 | 1.64 | 900 | 2344 | 60 | 0.515 | 114 | 43945 | 80 |
| Nitrogen | 28.01 | 1.4 | 900 | 1838 | 60 | 0.715 | 160 | 37517 | 68 |
| Xenon | 131.3 | 1.67 | 900 | 927 | 60 | 3.36 | 347 | 44869 | 82 |

The volumetric mass of a confined working fluid does not change from what it is at initial static pressure, however, the pressure per unit of volumetric mass changes directly with the change in absolute temperature (pressure increases by $\frac{1}{273}^{rd}$ for each Kelvin degree increase), while wave propagation velocity changes as a coefficient of the absolute temperature (the coefficient is 1.414, the hypotenuse of a 90° angle). Therefore, it is desirable to mix gases of different molecular weights and thermal properties in order to obtain working fluids with properties tailored to a specific model of engine generator.

As Table 1 illustrates, for a given quantity of heat injected into the thermoacoustic engine generator, the most thermally efficient working fluids are krypton @ 1.38 Btu/hp; argon @ 1.41 Btu/hp, neon @ 1.42 Btu/hp and helium @1.41 Btu/hp. Because of its high sonic velocity, helium is best for small machines with shorter waveguides. Argon has twice the specific heat and thermal conductivity of krypton, which means less initial work for the oscillator, while helium has ten times the specific heat and thermal conductivity of either. The drawback with helium is that it requires ten times the static pressure to have a mass-volume ratio equal to argon. Mixing the two gases enhances both the thermal and mass-volume ratios of the resulting compound working fluid. The mixture for a traveling wave thermoacoustic generator will have a larger fraction of the heavier gas, for its kinetic properties, as compared to a standing wave thermoacoustic refrigerator in which the mixture will have a larger fraction of helium, for its thermal properties.

In the thermoacoustic engine-generator, the thermal energy in the traveling waves is rejected to the environment via the cooler HX sub c, after it has done its work. This allows down-stream economizers, which are not part of this invention, to extract additional energy from the heat stream.

DETAILED DESCRIPTION OF THE INVENTION

The TAC Engine-Generator will be described with reference to drawings that are not to scale. In the drawing figures, the reference character 2 indicates the component referred to as HX sub h in the specification, and the reference character 7 indicates the component referred to as HX sub c in the specification.

Figure 1:
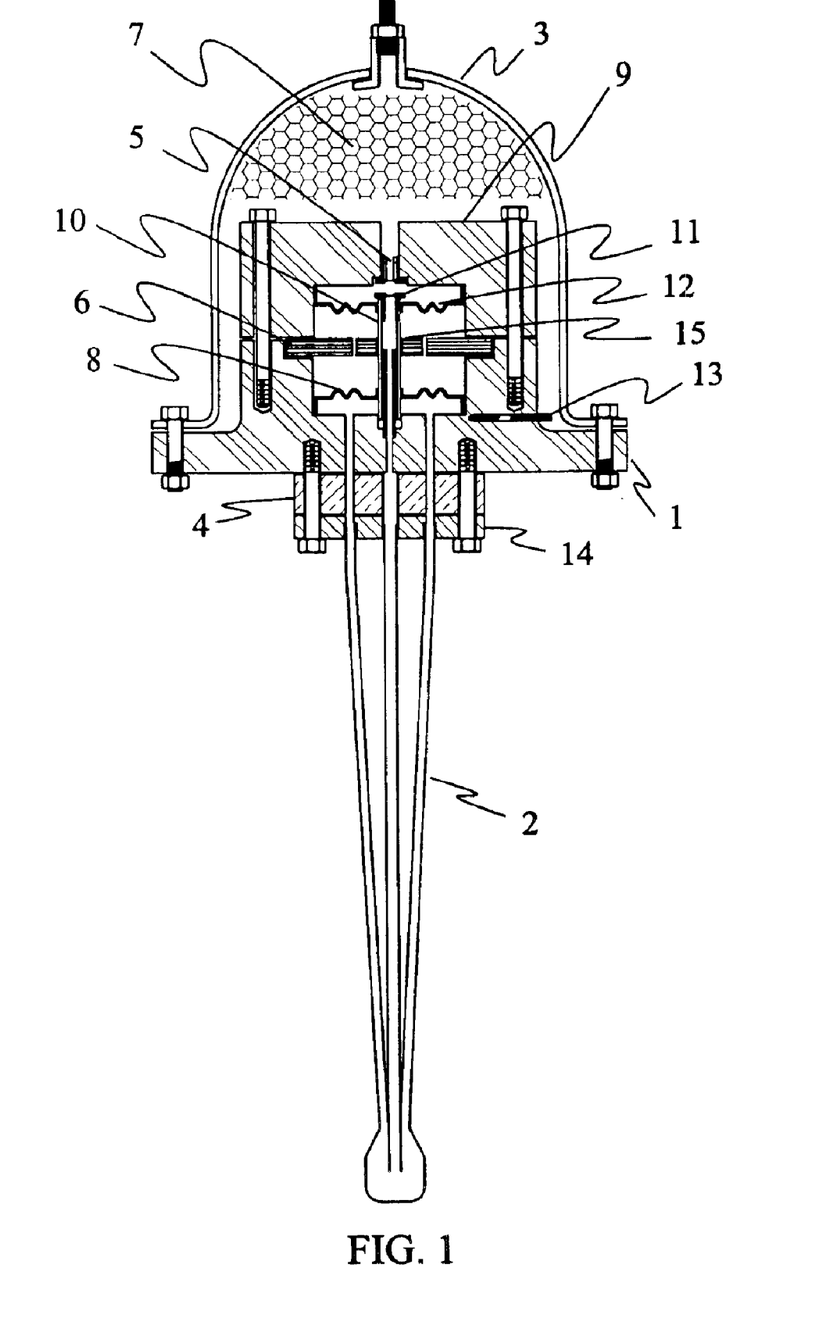
FIG. 1 is cutaway view of the TAC Engine-Generator showing all the component parts.

With respect to FIG. 1; the thermal break 4 is a thermal insulating means, preferably a material such as pressed fiber, ceramic or plastic, although other materials can be used, even metals that are poor conductors of heat. The purpose of the thermal break 4 is to minimize short-circuit thermal conduction between the first heat exchanger-waveguide 2, and the generator housing 1 in order to reduce conductive losses and increase thermal-to-electric conversion efficiency. Maximum efficiency depends upon maintaining the widest possible thermal gradient between the first heat exchanger-waveguide 2 and the second heat exchanger means 7. The first heat exchanger-waveguide 2 transfers thermal energy from the external thermal energy source to the internal working fluid, thereby increasing (amplifying) the pressure and temperature gradients of acoustic traveling waves transiting the first heat exchanger-waveguide 2. The thermal break 4 and the base plate 14 have ports that permit passage of the working fluid, and permit acoustic wave communication, between the first heat exchanger-waveguide 2 and the acoustic driven means spring diaphragm piston 8. The amplified acoustic traveling wave exits the first heat exchanger-waveguide 2, passes through the ports in the thermal break 4 and the base plate 14, causes a periodic pressure excursion within the generator housing 1 cavity where the acoustic driven means spring diaphragm piston 8 is housed, and acts upon the acoustic driven means spring diaphragm piston 8, thereby causing the attached armature to move a few millimeters along the plane of the armature axis toward the second heat exchanger means 7. The armature 10 is comprised of a hollow shaft and shorting rings 15. The armature shorting rings 15 are affixed to the armature shaft 10 and disposed on a plane perpendicular to the armature shaft 10. The armature 10 reciprocates along the armature shaft axis, thereby causing the shorting rings 15 to cut the magnetic lines of force created by the generator field windings 6 which surround the armature 10, and cause an induced electric current to flow in an output current winding not shown. Electromagnetic induction coupling, transformer action and transmission of alternating current electrical energy are well known in electrical engineering practice. The electric current is conveyed to an external load by output winding conductors not shown.

As the armature 10 reaches the extent of its travel toward the second heat exchanger means 7 it completes a half-cycle, and a metering means 13 permits the working fluid to flow through a port in the generator housing 1 at a metered rate, and into the second heat exchanger means 7, thereby relaxing the pressure gradient caused by the periodic acoustic traveling wave acting upon the acoustic driven means spring diaphragm piston 8.

The periodic pressure gradient of the acoustic traveling wave exits the first heat exchanger-waveguide means 2 and acts on acoustic driven means spring diaphragm piston 8, moving the armature shaft 10 along its axis and causing the shorting rings 15 to cut the magnetic lines of force generated by field winding 6. This action induces a current to flow in the shorting rings 15 creating a moving electrical field which further induces a current flow in the output winding 16 not shown. The acoustic pressure gradient acting on acoustic driven means spring diaphragm piston 8 is caused to relax by the working fluid metering means 13, and the armature spring mounting means 8 and 12 act to return the armature 10 to its original position, causing the armature shorting rings 15 to again cut the magnetic lines of force generated by the generator field windings 6, in the opposite direction, and inducing a current of opposite polarity in the output winding not shown, thereby completing the cycle. By this linear reciprocating action of the armature 10, alternating current is generated in the output winding.

The working fluid metering means 13 permits the over-pressure generated in the periodic acoustic traveling waves by the thermal energy flux in the first heat exchanger-waveguide means 2 to bleed through the wall of the generator housing 1 into the pressure vessel 3, and transfer the thermal energy to the second heat exchanger means 7.

To further clarify the operation of the engine; during each half-cycle stroke of the armature 10, a parcel of the cooled working fluid is pulled into the generator valve body 9 from the second heat exchanger means 7 through a first check valve means 5. Each alternate half-cycle stroke of the armature 10 causes said parcel of working fluid to be expelled from the generator valve body 9, through a second check valve means 11 disposed within a central opening in the armature shaft 10. By these means, a parcel of cooler working fluid is periodically pumped from the second heat exchanger means 7, passing through the armature shaft 10 and into the first heat exchanger-waveguide means 2 by the reciprocating action of the armature 10.

When the cooler parcel of working fluid enters the first heat exchanger-waveguide means 2 and mixes with the hotter working fluid contained therein, the parcel rapidly acquires thermal energy and expands in volume in accordance with Charles Law. The physical volume of the first heat exchanger-waveguide means 2 is fixed, therefore the sudden expansion of the newly introduced parcel of working fluid causes a pressure gradient to develop rapidly between the throat and mouth of the first heat exchanger-waveguide means 2. Entropic forces act to equalize the pressure across the first heat exchanger-waveguide means by generating a traveling acoustic pressure wave moving at the sonic velocity of the static working fluid. The energy of this traveling acoustic pressure wave transits the length of the first heat exchanger-waveguide means 2, passes through the thermal break 4 and enters the cavity in the generator housing 1 where the acoustic driven means spring diaphragm piston 8 is housed. The traveling acoustic pressure wave stalls therein, creating a momentary periodic pressure excursion. The momentary pressure excursion acts on the acoustic driven means spring diaphragm piston 8, causing the armature 10 to reciprocate, then the pressure bleeds off at a predetermined rate and exits via metering means 13 into the second heat exchanger means 7. The thermal energy transported by the traveling acoustic pressure wave is rejected to the second heat exchanger means 7 and a coolant coil, not shown, located therein.

When the working fluid and the heat exchangers 2 and 7 reach their respective optimum operating temperatures, the conditions are such that the traveling acoustic pressure waves develop a periodic thermoacoustic cycle equal in duration to the period of mechanical reciprocation of the armature 10, and the thermoacoustic engine and generator become a resonant system. Each reciprocating movement of the armature 10, caused by each traveling acoustic pressure wave, pumps another parcel of cooler working fluid into the relatively hotter first heat exchanger-waveguide means 2, thereby generating a traveling thermoacoustic pressure wave, and the cycle becomes self-regenerating and repeats for as long as a thermal energy gradient exists between the first heat exchanger-waveguide means 2 and the second heat exchanger means 7.

An external oscillator circuit not shown acts to start the thermoacoustic engine-generator by sending an alternating current through a section of the generator output winding 16. The oscillator current induces an alternating magnetic field in the generator output windings 16, said alternating magnetic field acts upon the armature 10 and causes said armature 10 to reciprocate and generate traveling acoustic pressure waves. The current generated by the armature 10 bucks the current from the oscillator. When the thermoacoustic engine-generator is operating in a condition of resonance, oscillator current is at a minimum and output current to the external load is at maximum.

The working fluid is typically under multiple atmospheres of pressure, and is contained by the pressure vessel 3 that surrounds the generator housing 1.

Figure 2:
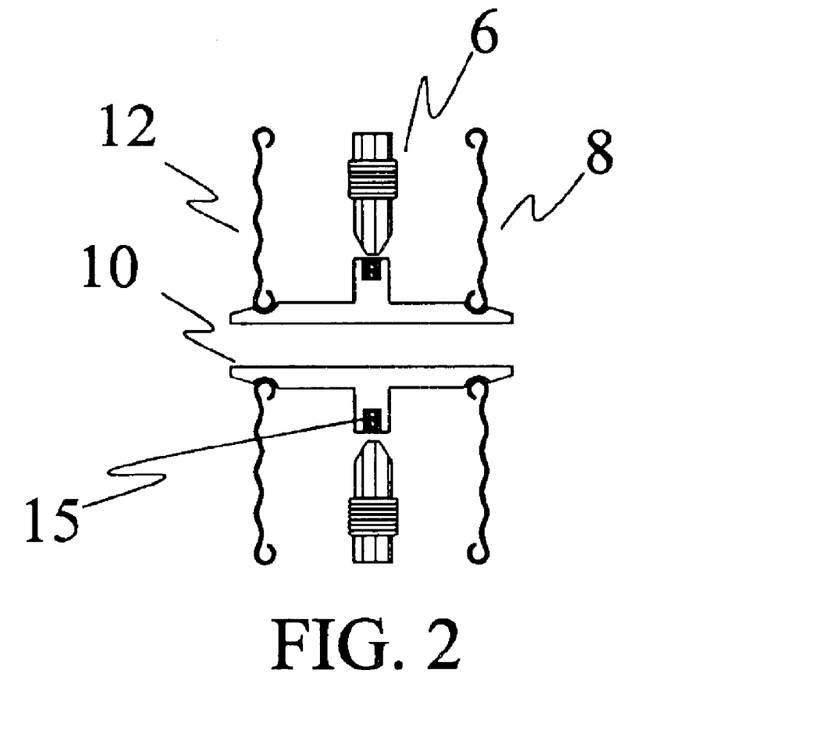
FIG. 2 is a cross-sectional view of the armature shaft, field windings, pole pieces and the spring diaphragm pistons that support the armature, showing their relationships when mounted in the generator housing.

With respect to FIG. 2, the acoustic driven means spring diaphragm piston 8 and acoustical traveling wave generating means 12 are supported in a fixed position on their outer periphery by the generator housing not shown, and in turn support the armature shaft 10 at its center and permit limited reciprocating movement of said armature shaft 10 along its axis plane. Said acoustic driven means spring diaphragm piston 8 and acoustical traveling wave generating means 12 cause the armature shaft 10 to remain centered with respect to its axis so that the armature shorting rings 15 can reciprocate in close proximity to the pole pieces of the field windings 6 without coming in contact. The magnetic field generated by the field windings 6 induce electromagnetic and electrical fields in the reciprocating shorting rings 15, which in turn induce a current flow in the electrical output winding 16 not shown.

Figure 3:
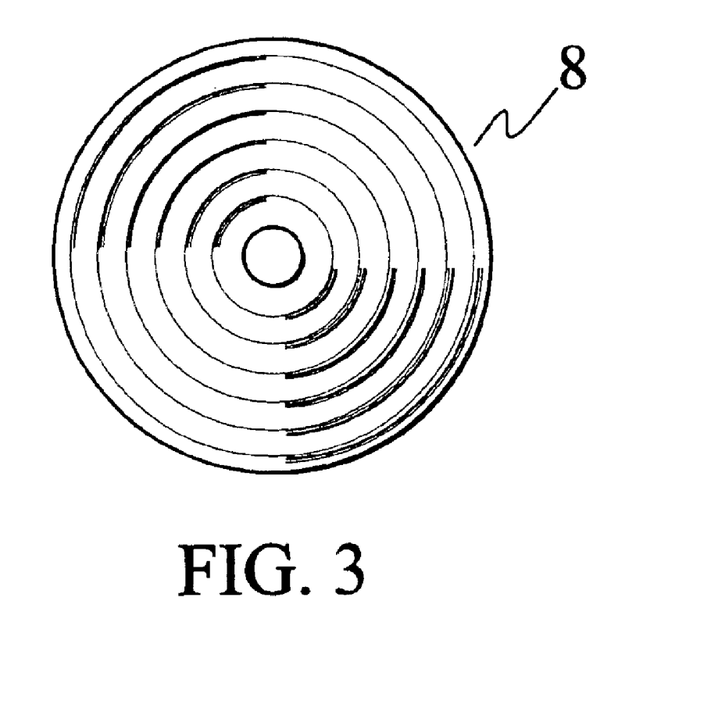
FIG. 3 is a planar view of a typical spring diaphragm piston.

FIG. 3 is a planar view of the acoustic driven means spring diaphragm piston 8 and duplicate acoustical traveling wave generating means 12 which also support the armature.

Figure 4:
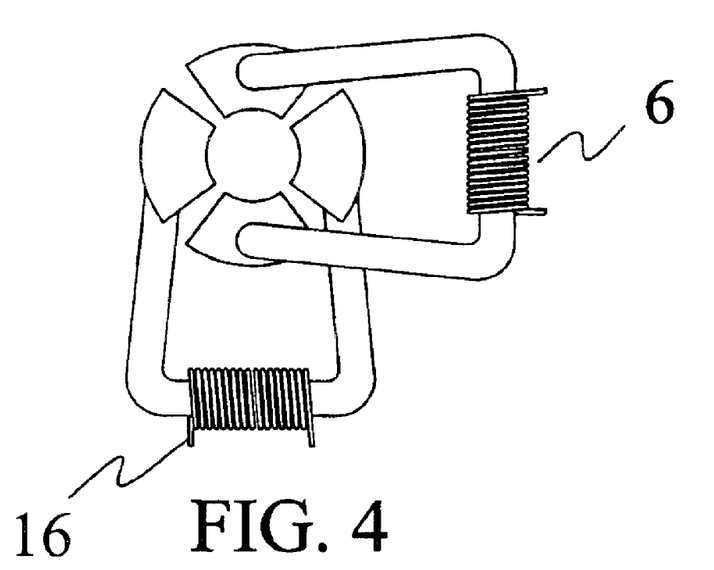
FIG. 4 is a planar view of the field winding, the output winding, and their related pole pieces.

FIG. 4 is a planar view of the field winding 6, and the output winding 16 showing how their respective pole pieces form a circular stator inside which the armature reciprocates.

Figure 5:
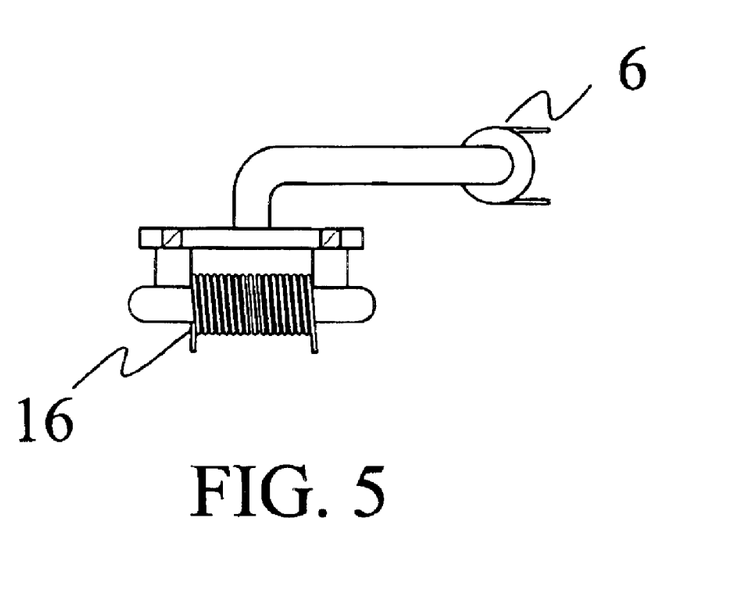
FIG. 5 is a side view of the field and output windings, showing the relative plane of their associated pole pieces when mounted in the generator housing not shown.

FIG. 5 is a side view of the field winding 6 and the output winding 16 showing how their respective pole pieces share the same plane when mounted in the generator housing not shown.

I claim:

1. A combined thermoacoustic heat engine and electrical generator comprising:

a) a thermally conductive envelopment means, a housing, for containing a compressible working fluid, b) said compressible working fluid being capable of supporting propagation of periodic acoustical traveling waves, c) in a first section of the housing, a combination first heat exchanger means and acoustic traveling wave guiding means, a first heat exchanger-waveguide means, for admitting thermal energy to the compressible working fluid and vectoring acoustic traveling waves moving through said compressible working fluid, d) in a second section of the housing, a second heat exchanger means for removing thermal energy from said compressible working fluid, e) a thermal insulating means dividing said first and second sections of said housing, and said first heat exchanger-waveguide means and second heat exchanger means contained respectively therein, with ported openings that permit communication of the compressible working fluid between said first and second heat exchanger means, f) an acoustical traveling wave generating means for causing periodic acoustical traveling waves to propagate on a path through the compressible working fluid in communication between said first heat exchanger-waveguide means and second heat exchanger means, g) an acoustical traveling wave driven means for converting periodic acoustical traveling waves into mechanical kinetic energy, h) an energy conversion means for converting said mechanical kinetic energy into electrical energy, i) a metering means for admitting and regulating a flow of heated, high pressure working fluid from said first heat exchanger-waveguide means and said acoustical traveling wave driven means, into said second heat exchanger means, j) a first check valve means for causing the admittance of cooler working fluid from said second heat exchanger means into the acoustical traveling wave generating means, thereby completing an acoustic and thermodynamic circuit in the working fluid, k) a second check valve means to prevent acoustic traveling waves from being reflected back into said acoustical traveling wave generating means from the first heat exchanger-waveguide means.

2. The heat engine as claimed in claim 1, combining an acoustic wave guiding means, a wave-guide, as an integral unit with the first heat exchanger means, a first heat exchanger-waveguide means, by means of which the periodic acoustical traveling waves are vectored, thermally amplified, and acoustic-impedance-controlled.

3. The heat engine as claimed in claim 1, in which said first heat exchanger-waveguide means is a thermal conductor in communication with the external environment and the internal working fluid for the purpose of transmitting thermal energy between said external environment and said internal working fluid.

4. The heat engine as claimed in claim 1, in which said acoustical wave generating means, comprising a diaphragm spring piston, is affixed to the armature shaft and so disposed as to cause periodic acoustic traveling waves to propagate on a path through the compressible working fluid from said first heat exchanger-waveguide means to said second heat exchanger means, when the armature reciprocates.

5. The heat engine as claimed in claim 1, in which thermal energy is injected into the periodic acoustical traveling waves via the first heat exchanger-waveguide means in order to amplify the temperature and pressure gradients of said periodic acoustical traveling waves with respect to the static working fluid through which they are propagating.

6. The heat engine as claimed in claim 1, in which the cross-sectional area of the first heat exchanger-waveguide means increases in the direction of wave propagation, the geometric flare of said first heat exchanger-waveguide means causing the periodic acoustical traveling waves to be vectored from said first heat exchanger-waveguide means to the acoustic wave driven means by controlling the acoustic path impedance so that one direction of acoustic wave propagation is favored, and further causes the propagation velocity and amplitude of said periodic acoustical traveling waves to be increased by injection of thermal energy into the working fluid, said amplitude being defined as the pressure-temperature gradient of said periodic acoustical traveling waves with respect to the static working fluid.

7. The heat engine as claimed in claim 1, in which the first heat exchanger-waveguide means comprises an acoustic delay line, said acoustic delay line being well known to acoustics engineering science, which in conjunction with the properties of the compressible working fluid and thermal gradient, controls the resonant period of the acoustical traveling waves which are propagating between the acoustic wave generating means and the acoustic wave driven means.

8. The heat engine as claimed in claim 1, in which the thermal insulating means divides the thermally conductive envelopment means into two separate sections which, in conjunction with said thermal insulating means, with said first heat exchanger-waveguide means in one section, said second heat exchanger means in another section, and said thermal insulating means disposed between the sections, impede short-circuit thermal conduction between said first heat exchanger-waveguide means and said second heat exchanger means.

9. The heat engine as claimed in claim 1 or claim 8, in which the thermal insulating means is penetrated by a multiplicity of through holes, ports, through which the energy of the periodic acoustical traveling waves is caused to communicate between said first heat exchanger-waveguide means and said second heat exchanger means via the compressible working fluid.

10. The heat engine as claimed in claim 1, in which said periodic acoustical traveling waves are caused to propagate through the compressible working fluid in contact with the internal wall of the first heat exchanger-waveguide means, which is typically at a higher temperature than said compressible working fluid, thereby causing an exchange of thermal energy between said first heat exchanger-waveguide means and said compressible working fluid, causing said periodic acoustical traveling waves which are transiting said compressible working fluid to be amplified in pressure and temperature, thereby increasing the work function of said periodic acoustical traveling waves, and by these means converting thermal energy to acoustic energy.

11. The heat engine as claimed in claim 1 or claim 10, in which the periodic acoustical traveling waves disturb the laminar boundary conditions existing at the interface between the working fluid and the internal wall of the first heat exchanger-waveguide means, causing a periodic change in the rate of thermal energy flow between said first heat exchanger-waveguide means and said working fluid.

12. The heat engine as claimed in claim 1, in which said first heat exchanger-waveguide means and said second heat exchanger means have properties that have been manipulated, by means of engineering craft and process, so as to regulate the rate and periodicity of flow of thermal energy to and from the working fluid, said properties being specific heat, sensible heat, latent heat, thermal conductivity, cross-sectional thickness, contact surface area and mass.

13. The heat engine as claimed in claim 1, or claim 12, in which the first heat exchanger-waveguide means and second heat exchanger means are further characterized by a property of thermal and acoustic resonance that is manipulated so as to cause said first heat exchanger-waveguide means and said second heat exchanger means to couple thermodynamically most efficiently with periodic acoustical traveling waves of a given frequency, and less efficiently with the static working fluid through which said periodic acoustical traveling waves are propagating, the coupling efficiency directly affecting the rate of thermal energy transferred per unit time between said first heat exchanger-waveguide means and said second heat exchanger means and the working fluid.

14. The heat engine as claimed in claim 1, in which the energy conversion means is a linear alternator, comprised of spring diaphragm pistons which support an armature assembly so that it is capable of reciprocating motion, in combination with a magnetic field generating means, an induction winding for conveying current from said linear alternator to an external load, and electrical pole pieces so disposed in relation to the armature that when said spring diaphragm pistons and armature assembly is caused to reciprocate by means of a fluctuating pressure gradient in the form of periodic acoustical traveling waves acting upon the spring diaphragm piston driven means, said linear alternator produces alternating electrical current.

15. The heat engine as claimed in claim 1 or claim 14, in which the piston-armature assembly of the energy conversion means is comprised of an armature shaft, having at a point along the axis of said armature shaft an enlarged diameter section perpendicular in plane to the axis of said armature shaft, said enlarged diameter section having a multiplicity of electrically conductive and magnetically conductive shorting rings affixed to the periphery of said enlarged diameter section and oriented along the same plane as said enlarged diameter section so as to form an electromagnetically inductive shorting ring assembly around the armature shaft.

16. The heat engine as claimed in claim 1, in which the armature shaft of the energy conversion means is suspended at one end by a first flexible spring diaphragm piston means, and at the opposite end by a second flexible spring diaphragm piston means, said first flexible spring diaphragm piston means comprising the acoustic wave generating means, and the second flexible spring diaphragm piston means comprising the acoustic wave driven means, said acoustic wave generating means and said acoustic wave driven means being coupled together mechanically via said armature shaft, and coupled acoustically via an acoustic path that communicates between said acoustic wave generating means, the first heat exchanger-waveguide means and the acoustic wave driven means.

17. The heat engine as claimed in claim 1 or claim 16, in which the acoustic wave generating means communicates with the acoustic wave driven means by means of acoustic traveling waves.

18. The heat engine as claimed in claim 1, in which the metering means is disposed between said acoustic wave driven means and the second heat exchanger means so as to cause the periodic acoustical traveling waves to slow and stall in the vicinity of the acoustic wave driven means, thereby giving up energy of inertial moment and causing periodic pressure-temperature peaks that mimic Stirling Cycle compressions in the working fluid.

19. The heat engine as claimed in claim 1, or claim 18, in which the metering means meters the acoustical and thermal energy in the stalled periodic acoustical traveling waves into said second heat exchanger means, where thermal energy is extracted from the working fluid and transmitted, via conduction, through the second heat exchanger means to an external heat sink.

* * * * *